United States Patent
Gross et al.

(10) Patent No.: US 7,908,033 B2
(45) Date of Patent: Mar. 15, 2011

(54) BUILT-IN SWEPT-SINE TESTING FOR A COMPUTER SYSTEM TO ASSURE VIBRATIONAL INTEGRITY

(75) Inventors: Kenny C. Gross, San Diego, CA (US); Aleksey M. Urmanov, San Diego, CA (US)

(73) Assignee: Oracle America, Inc., Redwood Shores, CA (US)

( * ) Notice: Subject to any disclaimer, the term of this patent is extended or adjusted under 35 U.S.C. 154(b) by 644 days.

(21) Appl. No.: 11/787,782

(22) Filed: Apr. 17, 2007

(65) Prior Publication Data

US 2008/0257046 A1    Oct. 23, 2008

(51) Int. Cl.
*G01M 1/38* (2006.01)
*G05D 19/02* (2006.01)

(52) U.S. Cl. ............ 700/280; 702/56; 702/75; 702/141; 73/579

(58) Field of Classification Search .......... 700/280; 702/56, 75, 141; 73/579
See application file for complete search history.

(56) References Cited

U.S. PATENT DOCUMENTS

| | | | |
|---|---|---|---|
| 2002/0123860 A1* | 9/2002 | Fioravanti et al. | 702/182 |
| 2003/0142601 A1* | 7/2003 | Fioravanti | 369/47.44 |
| 2004/0105231 A1* | 6/2004 | Chen et al. | 361/685 |
| 2004/0212913 A1* | 10/2004 | Jung et al. | 360/75 |

FOREIGN PATENT DOCUMENTS

JP    2005-50448    *  2/2005

* cited by examiner

*Primary Examiner* — Albert Decady
*Assistant Examiner* — Steven R Garland
(74) *Attorney, Agent, or Firm* — Park, Vaughan, Fleming & Dowler LLP; Anthony Jones

(57) ABSTRACT

Embodiments of the present invention provide a system that performs vibration testing in a computer system. The system starts by generating a vibration at a predetermined frequency in a computer system. The system then determines if the computer system has a resonance at the predetermined frequency. If so, the system adjusts an operating parameter of at least one computer system component to prevent the computer system component from vibrating at or near a resonance frequency.

17 Claims, 3 Drawing Sheets

BUILT-IN SWEPT-SINE TESTING FOR A COMPUTER SYSTEM TO ASSURE VIBRATIONAL INTEGRITY

BACKGROUND

1. Field of the Invention

Embodiments of the present invention relate to techniques for performing reliability testing in computer systems. More specifically, embodiments of the present invention relate to a method and an apparatus for performing swept-sine testing within a computer system to assure vibrational integrity.

2. Related Art

Some computer systems and storage arrays are adversely affected by vibration of system components. These vibrational problems are becoming increasingly more common because of the following trends: (1) cooling fans are becoming powerful; (2) chassis and support structures are becoming weaker because of design modifications to reduce cost and weight; and (3) internal disk drives, power supplies, and other system components are becoming more sensitive to vibration-induced degradation. For example, hard disk drives (HDDs) are becoming more sensitive to vibration because the storage density for HDDs has increased to the point where a write head has to align with a track which is less than 20 nanometers wide. Moreover, the write head floats only 7 nanometers above the disk surface. These extremely small dimensions make the read and write performance of the HDDs very sensitive to vibrations.

Complicating this issue, some computer systems and storage arrays do not lock fan speeds at fixed number of revolutions per minute (RPM). Instead, the fan speeds can vary. For example, at higher altitudes, where the air is thinner, fan blades turn faster. In fact, between sea level and 10,000 ft, fan speeds can vary by 10% or more.

These fan speed variations can cause vibrational resonances inside the chassis of a computer system. When the fan speed intersects an internal vibrational resonance, there can be a significant resonance-related amplification of the vibrations which can cause components such as disk drives and power supplies to fail.

Because fan speeds can vary with altitude, a system that is tested and qualified in a lab at one altitude may get distributed in the field at another altitude where the fan speed intersects a vibrational resonance, which can cause failures. A related problem is that new systems tend to have very low rotational friction for fan motors. With age, ball bearings lose roundness, lubrication dries out, and shaft axes gain eccentricity. Consequently, rotational friction increases and fan speeds can drop with age due to the increase in rotational friction. These effects mean that even if a system is qualified to have good vibrational integrity when the system is manufactured, if there are any structural resonances in the vicinity of the rotational frequency of the fans, the system may subsequently fail in the field.

In order to avoid the damage that can be caused by vibration, some system designers test prototypes of computer systems and storage arrays with a technique called "swept-sine" testing. Swept-sine testing is common for safety-critical mechanical systems such as aircraft and nuclear power plants, where the presence of structural resonances can have catastrophic consequences. To examine computer systems or storage arrays for the presence of structural resonances, system designers typically bolt a system under test onto a large programmable "shake table" that inputs a vibrational stimulus at a fixed frequency. The system designer then "sweeps" this frequency from a starting frequency (e.g. 1 kHz or 10 kHz) down to a very low frequency. By monitoring one or more vibration sensors (accelerometers) placed on or inside the system under test, the system designer can "map" the frequencies corresponding to vibrational resonances inside the system.

When the frequencies of the resonances are known, the system designer can adjust the fan speeds (and the speeds of other devices such as disk drives, tape drives, etc.) to avoid vibrations in the vicinity of the resonances. Alternatively, the system designer can mitigate the resonances. For example, the system designer can place a small mass, a dampener, or a stiffener at a specific location in the system.

The difficulty with the above-described approaches is that a customer may reconfigure their computer system, by adding and/or removing one or more system components. This changes the mass distribution of the system, which can create new structural resonances that can cause drive failures and can accelerate degradation of other system components.

For many computing systems, especially midrange and high-end systems, it is impossible to anticipate all the potential combinations of vendor and 3rd-party components that customers may install over the life of their computer system. Consequently, in order to accurately determine if new vibrational resonances are introduced in the system when a customer makes a configuration change, the system needs to be shipped to a facility with a shake table and retested.

Hence, what is needed is a method and apparatus for performing vibrational testing without the above-described problems.

SUMMARY

Embodiments of the present invention provide a system that performs vibration testing in a computer system. The system starts by generating a vibration at a predetermined frequency in a computer system. The system then determines if the computer system has a resonance at the predetermined frequency. If so, the system adjusts an operating parameter of at least one computer system component to prevent the computer system component from vibrating at or near a resonance frequency.

In some embodiments, when adjusting the operating parameter of the computer system component, the system adjusts the speed of a fan or an operating speed of a disk drive or a tape drive.

In some embodiments, the system generates vibrations across a range of frequencies in the computer system. The system then determines if the computer system has one or more resonances in the range of frequencies. If so, the system adjusts an operating parameter of at least one computer system component to prevent the computer system component from vibrating at or near the one or more resonances.

In some embodiments, the system outputs a representation of the resonances to a user, which enables the user to adjust an operating parameter of the system component to prevent the system component from vibrating at or near the resonance.

In some embodiments, the system generates the vibration at a predetermined time, wherein the predetermined time can include: (1) when the computer system is initially configured; (2) when the computer system's configuration is changed; or (3) when the computer system has been running for a pre-specified time.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the claims.

Computer System

Figure 1:
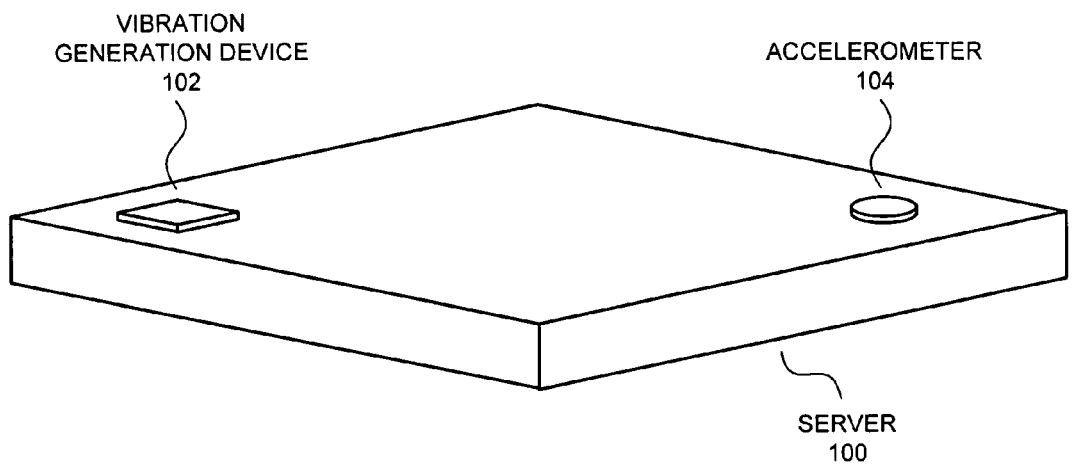
FIG. 1 illustrates a server in accordance with embodiments of the present invention.

FIG. 1 illustrates a server 100 in accordance with embodiments of the present invention. Server 100 includes vibration-generation device 102 and accelerometer 104. Note that although server 100 is used for the purposes of illustration, embodiments of the present invention can be applied to other computer systems, such as desktop computers, workstations, embedded computer systems, automated manufacturing systems, and other computer systems where vibrations can affect the life-span of system components.

In some embodiments of the present invention, vibration-generation device 102 is a transducer that accepts an input signal and outputs mechanical vibrations. The frequency of the mechanical vibrations vary according to the magnitude of an input voltage.

Accelerometer 104 measures the responding vibrations of the server while vibration-generation device 102 is outputting mechanical vibrations at a given frequency. Note that although server 100 is illustrated with one accelerometer 104, in some embodiments of the present invention, other components in server 100 that are to be protected from destructively amplified resonance vibrations also include accelerometers. For example, disk drives, peripheral boards, system board components, tape drives, ASICs, mounting brackets, and other components in the system may include one or more accelerometers. (Some commercial off-the-shelf (COTS) HDDs are already being manufactured with one or two internal accelerometers which can be used to measure the vibration experienced by the HDDs.)

When performing a swept-sine test (e.g., following a configuration change), the voltage input into vibration-generation device 102 can be swept through a range of voltages to produce a vibrational frequency range known to encompass the rotational frequencies for all components (fans, disk drives, tape drives, etc.) in the system. During the sweep, vibration-generation device 102 can also be configured to simulate vibrational frequencies that arise from "beat" phenomena (which can occur if 2 devices have close rotational frequencies).

In some embodiments of the present invention, vibration-generation device 102 is a COTS vibrator, such as the vibrators used in cell phones (although vibration-generation device 102 is modified to output vibrations at differing frequencies according to variations in an input voltage). The amplitude of vibration for these COTS vibrators is even sufficient for resonance mapping applications in high end servers because resonances can be identified at small vibrational amplitudes.

In some embodiments of the present invention, firmware included in server 100 performs swept-sine test when a configuration change has occurred (or at other predetermined times). Hence, internal resonance mapping can be performed in the factory, in Ongoing Reliability Testing (ORT), or in the customers' datacenter. In other words, systems no longer need to be shipped to a facility containing programmable shake tables in order to perform swept-sine testing. Moreover, computer systems can be tested in the actual "vibrational environment" in which they operate. For example, a swept-sine test can be performed on a computer system on a factory floor where the computer system picks up vibrations from nearby machines. In alternative embodiments, software such as the operating system triggers the swept-sine test when a configuration change has occurred (or at other predetermined times).

Note that in these embodiments, the swept-sine testing mechanism can be built in to the computer system or storage device (meaning that accelerometer 104, vibration-generation device 102, and other components that perform the swept-sine test are permanently coupled to the computer system).

In alternative embodiments, the mechanism for performing the swept-sine test is a separate device, which is coupled to the computer system to perform the swept-sine test. For these embodiments, accelerometer 104, vibration-generation device 102, and other components used during the swept-sine test are temporarily attached to server 100.

Swept-Sine Testing Process

Figure 2:
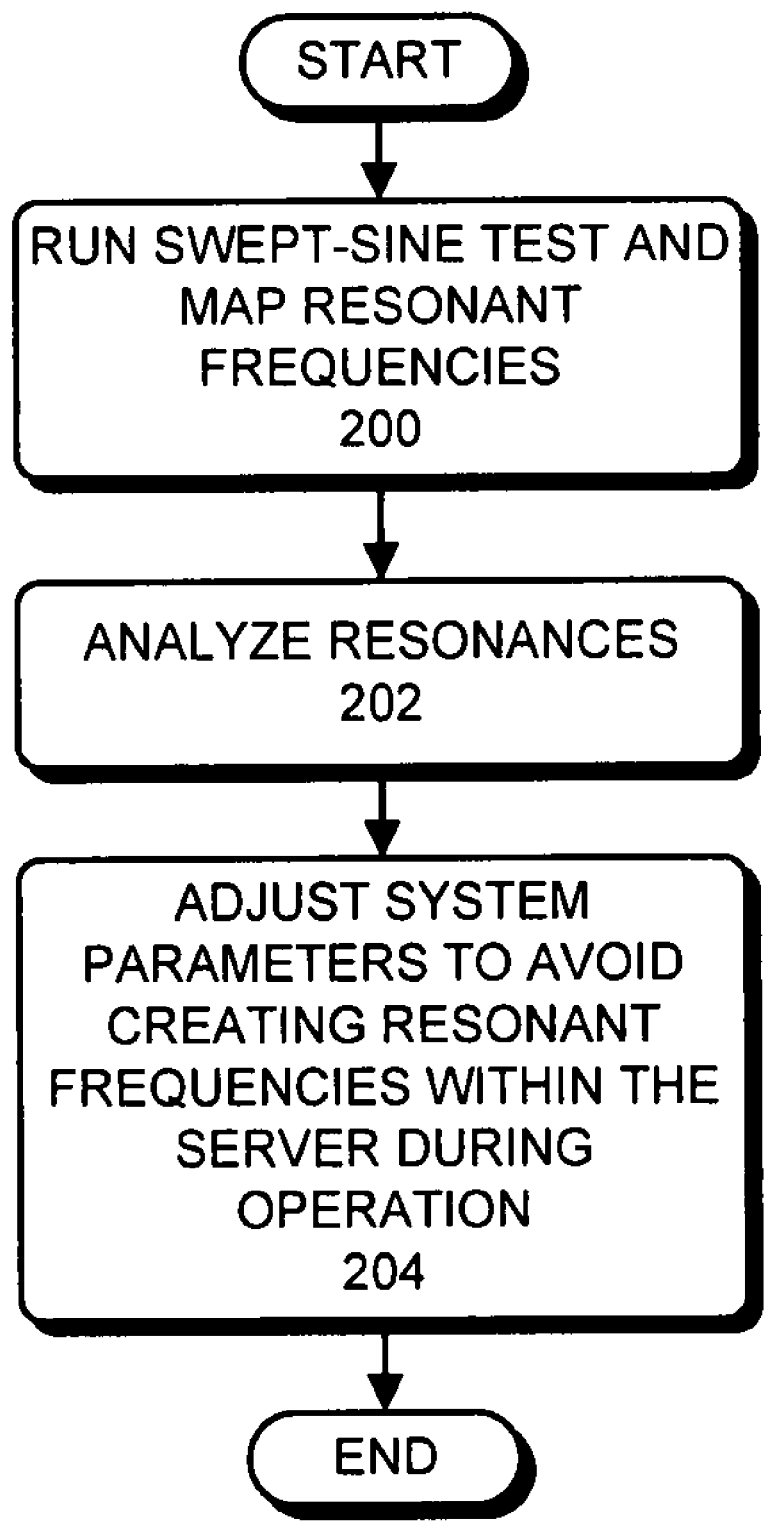
FIG. 2 presents a flowchart illustrating the process of performing a swept-sine test in a computer system in accordance with embodiments of the present invention.

FIG. 2 presents a flowchart illustrating the process of performing a swept-sine test in a server 100 (see FIG. 1) in accordance with embodiments of the present invention. At a predetermined time, a vibration-testing mechanism runs a swept-sine test on server 100 and maps the resonant frequencies (step 200). This predetermined time can occur: (1) when the server 100 is initially set up; (2) when a hardware configuration change occurs; or (3) when server 100 has been operating for a sufficient length of time (e.g., 6 months, 1 year, or 2 years).

While running the swept-sine test, the vibration-testing mechanism sweeps the voltage input to vibration-generation device 102 across a range of voltages. In response, vibration-generation device 102 outputs mechanical vibrations across a corresponding range of frequencies. While vibrational testing mechanism sweeps the vibration-generation device 102 through the range of frequencies, a data-acquisition mechanism collects a sequence of vibration samples from accelerometer 104.

The vibration-testing mechanism then analyzes the resonances (step 202). In other words, the vibration-testing mechanism examines the sequence of vibration samples collected by the data-acquisition mechanism to determine if there are any frequencies (resonances) at which the vibration detected by accelerometer 104 surpasses a given threshold.

The system then adjusts system parameters to avoid creating resonances within the server during operation (step 204). In some embodiments of the present invention, the system uses administrative controls to limit the speeds of fans in server 100 to avoid the resonances. For example, if a fan typically runs at 240 Hz and a customer memory upgrade creates a resonance at about 238 Hz, the system could set an administrative fan control speed at 250 Hz. In this case, if the nominal fan speed is moved to be higher than the new structural resonance and adequate cooling is still obtained, but destructive amplification of internally excited vibrations is now avoided. In some embodiments, the system uses the administrative controls to limit the rotational velocity of tape drives, optical drives, or hard drives, and to limit the activities of other system components to avoid vibrational resonances.

Figure 3:
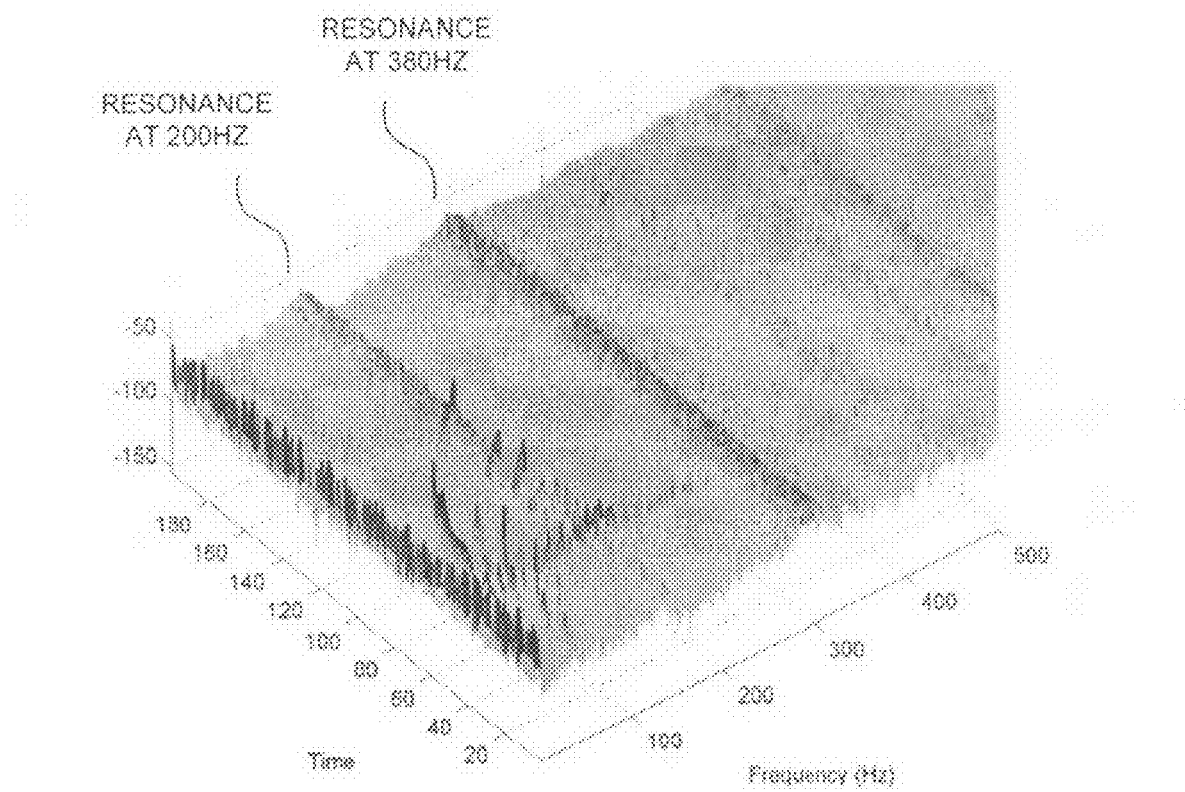
FIG. 3 presents a graph of resonances in accordance with embodiments of the present invention.

FIG. 3 presents a graph of resonances in accordance with embodiments of the present invention. The presence of spectral "ridges" at certain frequencies in FIG. 3 indicates the structural resonances in the system.

In some embodiments, the vibration-testing mechanism creates an output such as the graph in FIG. 3. Using such a graph, a user can visually interpret server 100's response to vibrations and can use administrative controls to accordingly limit vibrations in server 100. For example, given a resonance at 380 Hz (as shown in FIG. 3), the user can adjust fan speeds, drive speeds and can limit the activities of other system components in order to avoid the 380 Hz resonance.

The foregoing descriptions of embodiments of the present invention have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. An apparatus for performing vibration testing in a computer system, comprising:
   at least one vibration sensor coupled to at least one component in the computer system;
   a dedicated vibration-generation mechanism permanently coupled to the computer system, wherein the vibration-generation mechanism is a mechanism separate from the at least one other component and a fan in the computer system that is dedicated to generating a vibration within the computer system at a predetermined frequency;
   wherein the at least one vibration sensor is configured to sample the vibration of the computer system in response to the generated vibration;
   an analysis mechanism configured to use the sample to determine whether the computer system has a resonance at the predetermined frequency; and
   an adjustment mechanism configured to adjust a speed of the fan in order to avoid the fan causing vibrations in the computer system at or near a resonance frequency of the computer system determined by the analysis mechanism.

2. The apparatus of claim 1, wherein the adjustment mechanism is further configured to adjust a speed of a disk drive or a tape drive to avoid the disk drive or tape drive causing vibrations in the computer system at or near a resonance frequency of the computer system determined by the analysis mechanism.

3. The apparatus of claim 1, wherein:
   the vibration-generation mechanism is configured to generate vibrations within the computer system across a predetermined range of frequencies;
   the at least one vibration sensor is configured to sample the vibration of the computer system in response to the generated vibrations within the computer system across the predetermined range of frequencies; and
   the analysis mechanism is configured to use samples to determine whether the computer system has one or more resonances in the range of predetermined frequencies.

4. The apparatus of claim 3, further comprising an output mechanism configured to output a representation of the resonances to a user.

5. The apparatus of claim 3, wherein the vibration-generation mechanism is additionally configured to selectively generate a vibration within the computer system at predetermined times, wherein the predetermined times include:
   when the computer system is initially configured;
   when the computer system's configuration is changed; or
   when the computer system has been running for a pre-specified time.

6. The apparatus of claim 1, wherein the at least one vibration sensor is an accelerometer.

7. A method for performing vibration testing in a computer system, comprising:
   generating a vibration at a predetermined frequency in a computer system using a dedicated vibration-generation mechanism that is permanently coupled to the computer system, wherein the vibration-generation mechanism is a mechanism that is separate from other components and a fan in the computer system and is dedicated to generating vibrations within the computer system;
   determining if the computer system has a resonance at the predetermined frequency; and
   in response to determining a resonance, adjusting a speed of the fan to avoid the fan causing vibrations in the computer system at or near a determined resonance frequency of the computer system.

8. The method of claim 7, wherein the method further comprises adjusting an operating speed of a disk drive or a tape drive to avoid the disk drive or tape drive causing vibrations in the computer system at or near a determined resonance frequency of the computer system.

9. The method of claim 7, wherein the method further comprises:
   generating vibrations in a range of frequencies in the computer system;
   determining if the computer system has one or more resonances in the range of frequencies; and
   in response to determining one or more resonances, adjusting an operating parameter of at least one computer system component to prevent the computer system component from vibrating at or near the one or more resonance frequencies.

10. The method of claim 9, wherein the method further comprises outputting a representation of the resonances to a user, which enables the user to adjust an operating parameter of the at least one computer system component to prevent the at least one computer system component from vibrating at or near the resonance frequency.

11. The method of claim 9, wherein generating the vibration at a predetermined frequency in a computer system involves selectively generating the vibration at predetermined times, wherein the predetermined times include:
   when the computer system is initially configured;
   when the computer system's configuration is changed; or
   when the computer system has been running for a pre-specified time.

12. A computer system that performs vibration testing, comprising:
   a processor;
   a memory;
   at least one vibration sensor coupled to at least one of the processor, the memory, or other components in the computer system;
   a dedicated vibration-generation mechanism permanently coupled to the computer system, wherein the vibration-generation mechanism is a mechanism separate from the other components and a fan in the computer system that is dedicated to generating a vibration within the computer system at a predetermined frequency;

wherein the at least one vibration sensor is configured to sample the vibration of the computer system in response to the generated vibration;

an analysis mechanism is configured to use the sample to determine whether the computer system has a resonance at the predetermined frequency; and an adjustment mechanism configured to adjust a speed of the fan in order to avoid the fan causing vibrations in the computer system at or near a resonance frequency of the computer system determined by the analysis mechanism.

13. The computer system of claim 12, wherein the adjustment mechanism is further configured to adjust a speed of a disk drive or a tape drive to avoid the disk drive or tape drive causing vibrations in the computer system at or near a resonance frequency of the computer system determined by the analysis mechanism.

14. The computer system of claim 12, wherein:

the vibration-generation mechanism is configured to generate vibrations within the computer system in a predetermined range of frequencies;

the at least one vibration sensor is configured to sample the vibration of the computer system in response to the generated vibrations within the computer system across the predetermined range of frequencies; and the analysis mechanism is configured to use samples to determine whether the computer system has one or more resonances in the range of predetermined frequencies.

15. The computer system of claim 14, further comprising an output mechanism configured to output a representation of the resonances to a user.

16. The computer system of claim 14, wherein the vibration-generation mechanism is configured to selectively generate a vibration within the computer system at a predetermined times, wherein the predetermined time can include:

when the computer system is initially configured;

when the computer system's configuration is changed; or when the computer system has been running for a pre-specified time.

17. The apparatus of claim 12, wherein the at least one vibration sensor is an accelerometer.

* * * * *